United States Patent
van Putten et al.

(10) Patent No.: US 7,246,519 B1
(45) Date of Patent: Jul. 24, 2007

(54) DRIFT-FREE THERMODYNAMIC ANEMOMETRY

(76) Inventors: Maurituis H. P. M. van Putten, 266 Pearl St. A, Cambridge, MA (US) 02139; Anton F. P. van Putten, Aquariuslaanbz, 5632 BD Eindhoven (NL); Michel J. A. M. van Putten, Beukinkstraat 120, 7511 RR Enschede (NL); Pascal F A M V Putten, R. de Beerenbrouck St. 20, Delft (NL) 2613 AT ( * ) Notice: Subject to any disclaimer, the term of this patent is extended or adjusted under 35 U.S.C. 154(b) by 44 days.

(21) Appl. No.: 11/337,950

(22) Filed: Jan. 24, 2006

(51) Int. Cl.
*G01F 1/68* (2006.01)
(52) U.S. Cl. .................................... 73/202.5
(58) Field of Classification Search ............... None
See application file for complete search history.

(56) References Cited

U.S. PATENT DOCUMENTS

| | | | | |
|---|---|---|---|---|
| 4,461,173 A | * | 7/1984 | Olin | 73/202.5 |
| 4,648,270 A | * | 3/1987 | Johnson et al. | 73/202.5 |
| 5,279,154 A | * | 1/1994 | Vavra et al. | 73/202.5 |
| 6,044,701 A | * | 4/2000 | Doyle et al. | 73/202.5 |
| 6,308,553 B1 | * | 10/2001 | Bonne et al. | 73/202.5 |

* cited by examiner

Primary Examiner—Harshad Patel

(57) ABSTRACT

Advanced electronic metering of natural gas consumption is a new opportunity in the recent free market economy of the utility sector in the US and Europe. Real-time continuous measurements facilitate our awareness in the consumption of a non-renewable energy resource, which is a first step towards taking energy saving measures in domestic and commercial buildings. We here disclose a real-time desktop information system for natural gas consumption based on a new wireless electronic flow-meter. The meter is drift-free by subjecting thermal anemometry to a novel modulation technique. It uses a dynamical flow-interface to control the exposure of a thermal flow-sensor to a streaming medium. A discrete modulation of the flow perturbs the total heat-flux from the sensor to the medium. The relative perturbation, normalized to total heat-flux, creates a Nusselt number which is a function only of the Reynolds number of the flow. The medium temperature can be estimated on the basis of a similar factorization of the total heat-flux. Our method hereby measures both volume- and mass-displacement. In the preferred embodiments the interface consists of a by-pass configuration with micro-flow switches, controlling micro-jets applied to a silicon integrated flow-sensor. The device hereby forms a cost-effective and robust alternative to current approaches for electronic flow-metering. Its output is readily provided to a desk-top computer using existing wireless interfacing, serving energy-analysis and energy-saving strategies.

8 Claims, 2 Drawing Sheets

DRIFT-FREE THERMODYNAMIC ANEMOMETRY

BACKGROUND OF THE INVENTION

Figure 1:
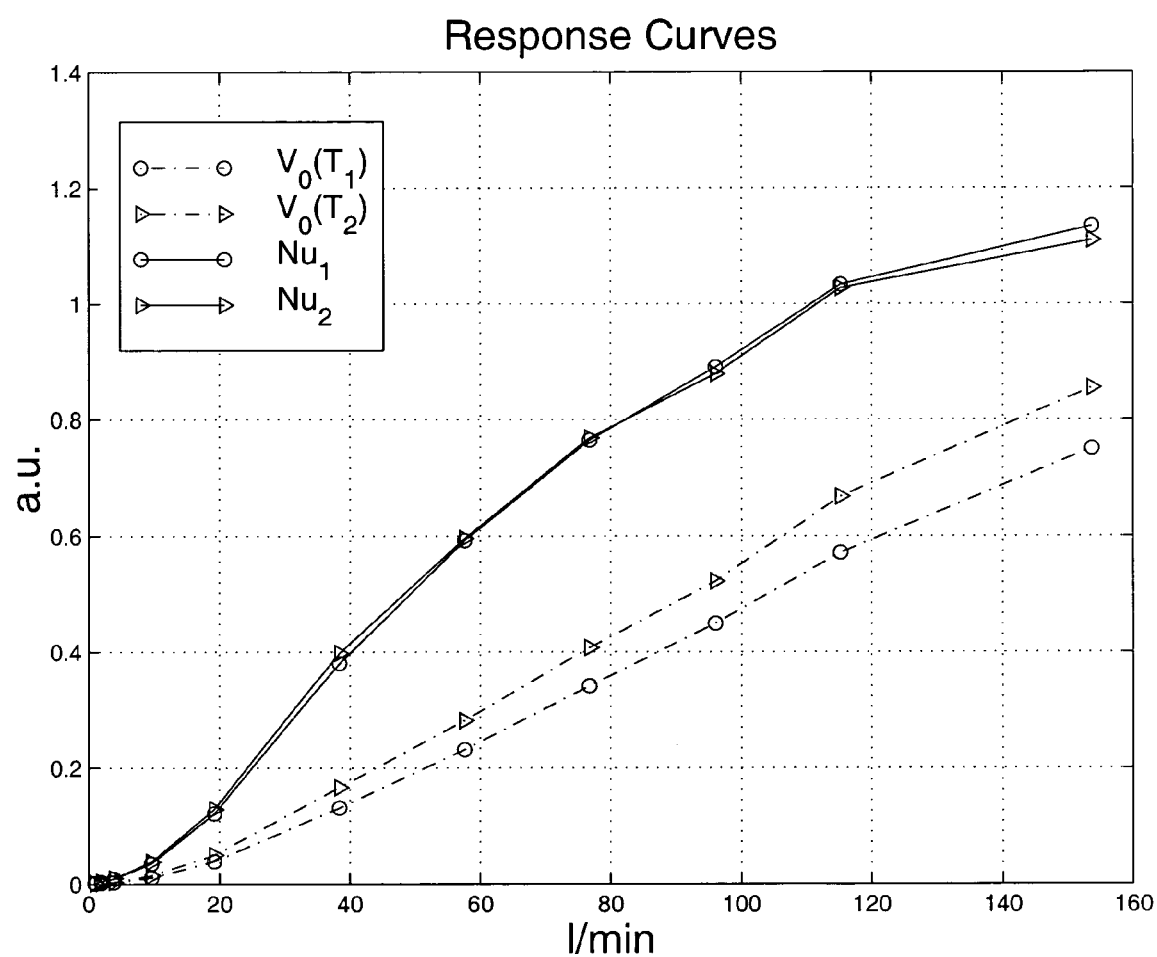

In recent years, the domestic energy sector has changed to a free market economy in a number of states and countries in the U.S. and Europe. This offers unprecedented opportunities for innovation, in bringing the utility sector up to par with modern technology, telecommunication and global commerce. We expect to witness novel competitive strategies in commercial metering, distribution and trading of electricity, natural gas and, possibly, water. This advance will be facilitated with the introduction of micro-electronic technology in metering of the consumption of natural gas.

Electronic metering of natural gas consumption is key to advanced home energy management systems. On the basis of real-time continuous measurements detailed insight can be gained in the relationship between gas consumption and a home climate, as well as the operation of home appliances. These data can further be used to perform detailed analysis of home energy saving measures, such as the installation of highly-efficient central heating sys-tems and insulating double-glass windows. To this end, we here propose a desktop display of domestic consumption of natural gas. Such will be possible by wireless interfacing to a fully electronic gas meter. This development is particularly interesting, in view of recent raises and uncertainties in the price and availability of natural gas, both in the US and Europe.

At present, metering of natural gas is performed by mechanical metering devices. This hampers the process of bringing data "inside" (in the US) or "out of the closet" (in Europe) to the desktop. The larger goal is integration into a utility sensor network, facilitated by the internet or wireless telemetry system. A common "work-around" uses electronic readers attached to and on top of existing mechanical devices. An example of this approach can be found in a recent Automatic Meter Reading system of the Water Department of the City of Cambridge of Massachusetts. The disparity between mechanical sensing and electronic data transfer has long been recognized, and has led to a variety of initiatives to develop comptable meters which are fully electronic. However, these initiatives have as yet to produce commercially viable alternatives to existing mechanical meters.

Up to this day, the world-wide standard for metering domestic use of natural gas is the mechanical bellow-meter. By principle of operation, this device measures displacement of volume of natural gas. This introduces inevitably an uncertainty in the caloric content of gas used, as determined by the displacement of mass of natural gas. For example, systemic discrepancies in temperatures at purchase of natural gas by a gas distributor and at supply to a consumer introduces a systemic discrepancy in the expected caloric content paid for by the latter. The bellow-meters hereby do not guarantee "pay for what they get" in true heat, unless these devices are temperature compensated. (The pressure in domestic gas connections is kept constant to within high precision.) In view of the additional cost, temperature compensation is generally applied only in the metering of large-volume customers, e.g., office buildings, industry and agriculture. In this case, more advanced meters of rotary-type (e.g. ROOTS in the US or INSTROMET in Europe) or vortex-type are commonly used.

In this disclosure, we focus on a method for comptable metering of natural gas for domestic customers by thermal anemometry. Thermal anemometry is in principle and ideal measurement principle, in that it accurately measures mass-flow under a wide range of medium pressures. However, practical realizations have proven to be challenging in view of drift in response to temperature changes of the medium and the device, wherein the latter may have a variety of time-constants. This calls for a systematic approach for the design of a drift-free meter. For commercial applications, the cost of the manufacturing should be kept low by circumventing the need for detailed calibration procedures. For ease-of-use, the data must be communicated to the outside world by wireless interfacing. These data can then be presented to the desktop of the consumer for detailed analysis as input to energy-saving strategies. The same data can be offered to metering companies and the gas distributor for billing purposes and large-scale consumer analysis.

For comptable metering of natural gas, we shall work with the following basic requirements:

The output is caloric content by measuring mass-displacement of natural gas.

The flow-range covers 1 l/min to a few hundred l/min with pressure drop of a few mbar.

The device uses a single sensor and the response curve is drift free (with zero offset and zero multiplicative drift).

The objective of is to fix the response curve by geometry alone to circumvent detailed calibration procedures.

A brief description of the method is disclosed below, together with experimental results on the measurement of Reynolds number and temperature of air flow on the basis of a first-principle flow-generator, a preferred embodiment and a set of claims.

SUMMARY OF THE DISCLOSURE

We use the principle of thermal anemometry using a single silicon integrated sensor. The sensor consists of a silicon integrated chip with thermal feedback as first disclosed in van Putten (1974, 1975). Thermal anemometry measures mass-flow which is inherently compensated for pressure changes. Thermal feedback controls a constant mean temperature under operating conditions (1985, 1996) for stable operation and fast response. This device has been commercialized by Van Putten Instruments B. V., Delft, The Netherlands.

With an on-chip Wheatstone bridge of sensing elements, the sensor has bi-directional sensitivity to flow (van Putten et al. 1994, 1997, 1999). A bi-directional sensor can be made free of additive drift by the Alternating Direction Method of van Putten et al. (1995, 2002). This method introduces a high-sensitivity and commensurate wide dynamic range of several orders of magnitude (van Putten et al. 1994). It further fixes the response curve without fine-tuning, as demonstrated experimentally in van Putten et al. 2001, even when using standard manufacturing, mounting, and packaging processes. The overall sensitivity in the resulting sensor characteristic is hereby a function only of the temperature of the medium, given a mean temperature of the sensor fixed by thermal feedback.

The response curve measures a flow-induced Nusselt number that is effectively independent of medium temperature, following normalization with respect to the total power dissipated in the chip. This normalization expresses the relative gradient in heat-flux from the sensor to the medium as a function of Reynolds number. Likewise, the total heat-flux is the product of a function of the Reynolds number and the medium temperature. Factoring out the former produces a measure for the medium temperature independent of the Reynolds number. In this fashion, the two output signals of the sensor subject to our discrete modulation technique, namely the total heat-flux and the induced perturbation thereof, are converted into a measurement of the Reynolds number and medium temperature. Combined, the latter two quantities determine the volume- and mass-displacement of the flow.

The above is embodied in the equations for the gradient δP in total heat-flux P from the sensor to the medium with temperature difference $\Delta T = T_c - T_m$, $$\delta P = f(Re)h(\Delta T),\ P = g(Re)h(\Delta T), \quad (1)$$

where Re refers to the Reynolds number of the flow, $T_c$ is the temperature of the chip and $T_m$ is the medium temperature. Note that $f(Re) = -f(-Re)$, $g(Re) = g(-Re)$ and $h(0) = 0$. Here, the heat-flux passes through a surrounding hydrodynamic flow, whose structure in general develops as a function of Re and Grashof number. The latter represents a measure for heat-induced flow in terms of a ratio of buoyant-to-viscous forces. We here consider modulation by an external flow, such as by the Alternating Direction Method. We thus only measure perturbations of a hydrodynamic flow around the sensor by an external flow, wherein dependence on the Grashof number is effectively cancelled out. This gives rise to the general form (1). Normalization of the induced change δP in heat-flux in or across the sensor introduces the Nusselt number $$Nu = \frac{\delta P}{P} = F(Re), \quad (2)$$

which is a function of Reynolds number only. A silicon flow-sensor operates at relatively modest temperatures, for which $\Delta T/T_m$ is a small parameter. Typical parameters are $T_c = 340$ K and $T_m = 300$ K. Consider a one degree temperature variation in $T_m$. It introduces a 2.5% temperature variation in $\Delta T$, and a mere 0.3% variation in the density. Hence, heat-flux variations depend to leading order on temperature variations in $\Delta T$, wherein the density, kinematic viscosity and thermal heat-conductivity in the flow around the sensor remains effectively constant. The temperature dependence on $\Delta T$ in δP and P are hereby to leading order the same and, in fact, nearly linear. Thus, the normalized total dissipation, $$\frac{P}{P_0} = H(\Delta T), \quad (3)$$

is a measure for the medium temperature, where $P_0$ denotes the total dissipation according to (1) at a reference temperature $T_m = T_0$ (e.g., 300 K). By (1) and the symmetry property $g(Re) = g(-Re)$, P is approximately linear with respect to the square of the Nusselt number. Alternatively, we are at liberty to place a separate temperature sensor in the flow.

In a by-pass configuration with linear flow-resistor, the Reynolds number of the flow over the sensor is proportional to the Reynolds number of the flow in the main duct. This configuration remains sensitive at low flow while it creates a low pressure drop at high flow, especially compared to a quadratic flow-resistor in the form of a Venturi-element. Enhanced performance at high flows has further been observed, when the flow through the by-pass is mediated to the sensor in the form of micro-jets. Thus, we can satisfy the constraint of wide-dynamic range in flow and mbar pressure drops for the purpose of metering domestic usage of natural gas. The intended modulation of the micro-jets be realized using commercially available micro-flow switches.

Summarizing, our approach to comptable metering measures a Nusselt number versus the Reynolds number of the flow, using a synergy of thermodynamic anemometry with the following elements:

- A by-pass configuration comprising a thermal sensor and a dynamical flow-interface for discrete modulation of micro-jets.
- Determination of Reynolds number and medium temperature by software analysis of modulated heat-fluxes from sensor to micro-jets.
- Wireless data transmission to desktop and utility sensor networks.

Below, we present experimental results on the Nusselt number as a function of Reynolds number, and demonstrate its temperature independence.

SURVEY OF THE DRAWINGS

FIG. 1 shows the Nusselt number Nu as a function of flow-rate through the main duct, and hence, implicitly, the Reynolds number of the flow. Here, the Nusselt number represents a gradient in the heat-flux of a silicon vector sensor relative to its total heat-flux to the medium. It shown for two measurements $Nu_i$, performed at distinct temperatures $T_i$ (i=1, 2). The temperatures differ by a few degrees, for which the true gradient δP across the sensor chip differs by approximately 13%. Here, δP is measured in terms of voltages $V_0(T_i)$ (i=1, 2) at the output terminals of a Wheatstone bridge integrated on the silicon sensor. The measurements are performed with a piston-cylinder flow-generator, powered by a computer-controlled linear motor with a linear resolution of over 100,000 steps. This first-principle calibration standard controls a volume-displacement with a resolution of about 100 μl. The uncertainty shown at large flows is a discretization error, due to the limited displacement of the piston of about 20 cm in combination with the finite switching time of about 1 s in ADM. The results indicate a satisfactory temperature-independence in the relationship between Nusselt and Reynolds number.

Figure 2:
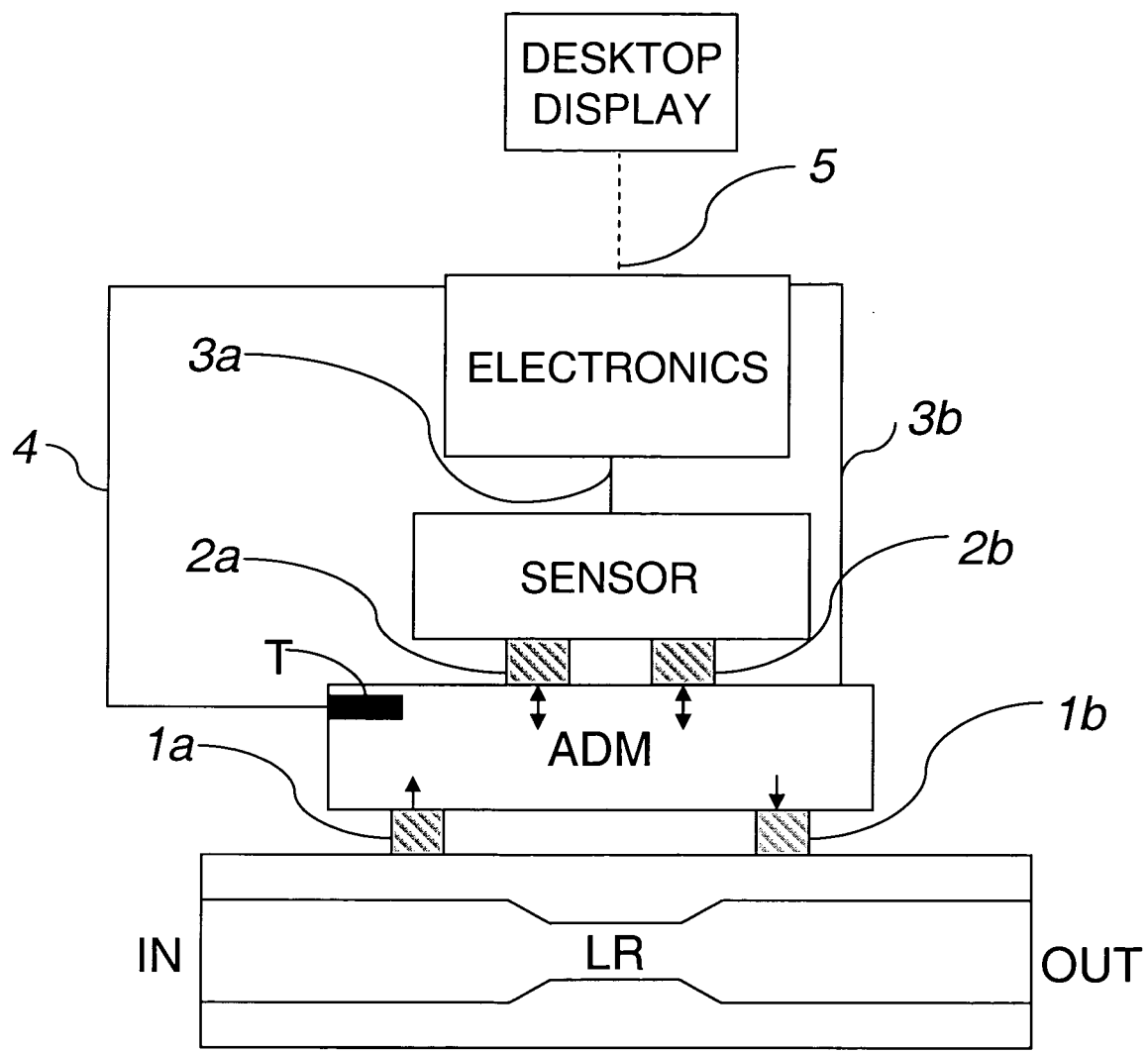

FIG. 2 shows a schematic overview of the device, comprising 1. a linear flow resistor LR in a main duct between gas supplier (IN) and consumer (OUT);
2. tapping of a minor fraction of the main flow into a by-pass unit via ports 1a and 1b;
3. a by-pass unit with ADM producing flow-reversals in output ports 2a and 2b;
4. a bi-directional silicon integrated vector sensor connected to ports 2a and 2b;
5. electronics for powering the sensor, reading its output over 3a, control over ADM via 3b and, when present, reading of a temperature sensor T via 4;
6. a wireless connection 5 for display to consumer and integration into a utility sensor network.

The electronics performs synchronized correlation of the sensor output 3a with the two states of the ADM-units via control output 3b. By software analysis according to (1), a readout of true mass-flow and medium temperature is calculated. The medium temperature is calculated either through analysis of the two signals coming of the sensor, based on (3), or by using an additional, separate temperature sensor T.

PREFERRED EMBODIMENTS

All construction materials which are in direct contact with the medium must be inherently safe and robust in the application to natural gas metering. For optimal temperature estimation according to (3), materials with small thermal time-constant are preferred.

In a preferred embodiment, the sensor is a silicon integrated vector sensor with bi-directional sensitivity for maximal sensitivity at low-flow under application of ADM. For a cost-effective manufacturing processes, it is preferred that the sensor is combined with its sensor holder in a single silicon chip. This combination can be placed in a package with hybrid connections, comprising both electrical pin connections and micro-flow ducts. As such, a hybrid component is fully compatible with standard pick-and-place equipment, including mounting by SMD. In particular, the flow-ducts of the hybrid package are positioned to facilitate interfacing to micro-flow switches, which make up the means for discrete modulation of the flow.

Implementation of ADM can be realized using commercially available 3/2 micro-flow switches. They can be controlled by a CPU over connection 3b in FIG. 2 by the electronic circuitry which powers the sensor and which reads the sensor output signals. We note that the resulting correlation maintains bi-directional sensitivity with respect to the flow in the main duct. A generally symmetric construction of the linear flow-resistor LR and the ADM unit is therefore preferred.

A maximal dynamic range is achieved by including a micro-jet interface between ADM and the sensor, wherein ADM is configured over a linear flow-resistor in the main duct. In practice, a linear flow resistor element consisting of small ducts, in which the flow is laminar and follows a Poisseuille profile, can be used. It produces the desired resolution at low flow, while maintaining limited pressure drops at high flow.

A preferred embodiment of the analogue-digital electronics uses commercially available micro-processors and modern high-resolution AD-converters. It will be appreciated that covering a dynamic range of three orders of magnitude in electric signal requires at least 16 bits ADC for proper resolution. The interface with the outside world, likewise, is preferably through existing telecommunication facilities for low-cost installation and operation, e.g., GPRS or the internet.

SUMMARY

The recently deregulated utility market in the US and Europe and the increasing price uncertainties therein offer unprecedented opportunities for advances in metering and data analysis of the consumption of natural gas by domestic users. We here disclose a method and device for a wireless desktop display of real-time natural gas consumption. We describe a drift-free flow-meter based on thermodynamic anemometry using a novel modulation technique. The combination of total heat-flux and flow-induced perturbations thereof from sensor to a streaming medium provides a measure for the medium temperature and a Nusselt number versus Reynolds number of the flow. The preferred embodiment is in a by-pass configuration with a single silicon integrated vector sensor, wherein the sensor is activated by micro-jets modulated by the Alternating Direction Method. Experimental results show a large dynamic range, sensitivity down to 1 l/min, and a low-pressure drop down to a few mbar. The resulting performance characteristics are hereby fixed by geometry and choice of materials alone, which ensures consistency in mass-production and reduction or elimination of detailed calibration efforts. With wireless interfacing, the device serves consumers and can be integrated in a utility sensor network for processing by gas metering and distribution companies.

We claim:

1. A method for flow-metering by thermodynamic anemometry with the property that the sensor is subject to a modulated flow which produces a perturbation of the distribution of heat-flux from sensor to the medium, wherein said perturbation relative to the total of said heat-flux represents a Nusselt number versus the Reynolds number of said flow, said Nusselt number hereby providing a measure for the volume-displacement of said flow.

2. A method for flow-metering by thermodynamic anemometry according to claim 1 with the property that the temperature of said medium is calculated from said total heat-flux after factoring out its dependence on said Reynolds number, where said temperature is used to calculate mass-displacement from the measured volume-displacement by Nusselt number.

3. A method for flow-metering by thermodynamic anemometry according to claim 1 with the property that said perturbation is created by switching on and off a micro-jet, said micro-jet representing a small fraction of said flow by means of micro-flow switches, where said micro-jet acts on or nearby temperature sensitive elements on said sensor.

4. A method for flow-metering by thermodynamic anemometry according to claim 1 with the property that said perturbation represents a spatial gradient in heat-flux from a vector sensor to the medium, where said gradient is modulated by alternatingly switching on either one of two micro-jets, where said micro-jets act on or nearby temperature sensitive elements on said sensor.

5. A device for flow-metering by thermodynamic anemometry with the property that the sensor is a silicon integrated flow sensor, in which said sensor is positioned in a by-pass unit containing micro-flow switches to modulate a fraction of the flow tapped from the main duct, such that said modulation produces a perturbation in the distribution of heat-flux from the sensor to said fraction of the flow, wherein said perturbation relative to the total of said heat-flux represents a Nusselt number versus Reynolds of said flow, said Nusselt number hereby providing a measure for the volume-displacement of said flow.

6. A device for flow-metering by thermodynamic anemometry according to claim 5 with the property that the temperature of said medium is calculated from said total heat-flux after factoring out the dependence on said Reynolds number, where said temperature is used to calculate mass-displacement from the measured volume-displacement by Nusselt number.

7. A device for flow-metering by thermodynamic anemometry according to claim 5 with the property that said sensor silicon integrated flow sensor also contains a silicon holder, said sensor containing the sensing and heating elements integrated on a silicon lever, said lever attached to a surrounding silicon holder, said combination of sensor and holder being realized by silicon etching, such that said chip is packaged as a micro-electronics component for mounting on a printed circuit board, where said package includes hybrid connections comprising both electrical pin-connections and micro-flow ducts, where said micro-flow ducts are connected to an assembly of micro-flow switches, where said micro-switches are switched on and off to modulate the heat-flux of the chip in response to a streaming medium.

8. A device for flow-metering by thermodynamic anemometry according to claim 5 with the property that said devices are combined into a wireless sensor network for real-time and continuous reading on a remote desktop, serving consumers, gas metering companies and distributors.

* * * * *